(12) United States Patent
Colley et al.

(10) Patent No.: US 6,349,961 B1
(45) Date of Patent: Feb. 26, 2002

(54) COMPOSITE MOLDED SNOWBOARD WITH METAL EDGES

(75) Inventors: David Colley, Paradise; Joseph McRoskey, Solana Beach; Olaf Mjelde, Valley Center, all of CA (US)

(73) Assignee: Jumbo Snowboards, LLP, Carlsbad, CA (US)

( * ) Notice: Subject to any disclaimer, the term of this patent is extended or adjusted under 35 U.S.C. 154(b) by 0 days.

(21) Appl. No.: 09/333,343

(22) Filed: Jun. 15, 1999

(51) Int. Cl.7 .............................. A63C 5/04; B62B 15/00
(52) U.S. Cl. ..................................... 280/608; 280/14.22
(58) Field of Search .............................. 280/14.22, 602, 280/608; 441/68; 264/275, 278

(56) References Cited

U.S. PATENT DOCUMENTS

| | | | |
|---|---|---|---|
| 3,782,744 A | * 1/1974 | Milovich et al. | 280/18 |
| 3,782,745 A | * 1/1974 | Stoveken | 280/18 |
| 3,894,744 A | * 7/1975 | Benner | 280/608 |
| 3,958,810 A | 5/1976 | Bohm | |
| 4,026,575 A | 5/1977 | Hartwig | |
| 4,337,963 A | 7/1982 | Stevenson | |
| 4,571,195 A | * 2/1986 | Brooks, Jr. | 441/74 |
| 4,590,023 A | * 5/1986 | Hayashi et al. | 264/46.5 |
| 4,725,070 A | 2/1988 | Maruyama | |

(List continued on next page.)

OTHER PUBLICATIONS

Thomas W. Betts, Co–Injection Molding '95: Marker Outlook, Battenfeld of America.

(List continued on next page.)

Primary Examiner—Brian L. Johnson
Assistant Examiner—G B Klebe
(74) Attorney, Agent, or Firm—Karl Stauss

(57) ABSTRACT

Products of and methods for producing complex shapes of composite molded articles, including snowboards, that meet or exceed the aesthetic, cost and performance requirements expected of similar non-molded composite articles. The injection molded or co-injection molded snowboard comprises a top surface and a bottom surface shaped to provide a center portion, at least one tip or tail portion and edges along the sides of the center portion, wherein the bottom surface is a substantially smooth continuous surface, the center portion is cambered away from the top surface and contains metal edges along the sides of the bottom surface center portion, the tip or tail portions are curved away from the bottom surface of the snowboard and the top surface contains binding mounts or screw threads flush mounted to secure bindings.

14 Claims, 7 Drawing Sheets

U.S. PATENT DOCUMENTS

| | | | |
|---|---|---|---|
| 4,778,710 A | * 10/1988 | Deutsch | 428/192 |
| 4,897,063 A | 1/1990 | Scheurer et al. | |
| 5,171,509 A | * 12/1992 | Le Masson et al. | 280/610 |
| 5,173,226 A | 12/1992 | Cazaillon et al. | |
| 5,288,442 A | * 2/1994 | Bauvois | 264/45.2 |
| 5,303,949 A | * 4/1994 | Harper et al. | 280/608 |
| 5,445,403 A | 8/1995 | Cazaillon et al. | |
| 5,501,825 A | * 3/1996 | Jodelet | 264/46.5 |
| 5,538,272 A | * 7/1996 | Peart | 280/602 |
| 5,544,908 A | 8/1996 | Fezio | |
| 5,687,983 A | 11/1997 | Feketa et al. | |
| 5,695,209 A | * 12/1997 | Deborde et al. | 280/610 |
| 5,716,562 A | 2/1998 | Peart et al. | |
| 5,769,445 A | 6/1998 | Morrow | |
| 5,782,482 A | 7/1998 | Andrus et al. | |
| 5,823,562 A | 10/1998 | Stubblefield | |
| 5,851,331 A | 12/1998 | Grenetier et al. | |
| 5,855,389 A | 1/1999 | Andrus et al. | |
| 5,871,224 A | 2/1999 | Vance | |
| 6,036,218 A | * 3/2000 | Muff, Jr. | 280/608 |
| 6,045,739 A | * 4/2000 | Abe | 264/277 |

OTHER PUBLICATIONS

Thomas W. Nash and Ralph J. McDonald, Molded–In Shielding Using the Coinjection Process, IBM Application Business Systems, Rochester, MN 55901.

Bruce R. Denison, Coinjection Molding with Automotive Polyolefins, D & S Plastics International.

Joseph McRoskey and Thomas W. Nash, Recycling—Why Not Use Co–Injection Molding?.

Joseph McRoskey, Co–Injection Molding: Current Applications, Co–Mack Technology, Inc., May 31—Jun. 2, 1998 Plastics Product Design & Development Forum.

Ride Snowboards web site, http://www.ridesnowboards.com.

Burton Snowboards web site, http://www.burton.com.

K2 Snowboards web site, http://www.k2snowboards.com.

Salomon Snowboards web site, http://www.salomonsports.com/northamerica/snowboarding/connect/pub.html.

Morrow Snowboards web site, http://www.morrowsnowboards.com.

* cited by examiner

COMPOSITE MOLDED SNOWBOARD WITH METAL EDGES

FIELD OF THE INVENTION

The present invention relates generally to products of and methods for producing complex shapes of composite molded articles, including a snowboard with metal edges, by the process of co-injection molding.

BACKGROUND OF THE INVENTION

None of the following is admitted to be prior art to the present invention.

Injection molded, including co-injection molded, articles could be vastly improved if there was a method for producing complex shapes of composite molded articles, in a single molding operation; thus optimizing the value of injection molding and maintaining or improving the characteristics expected of similar non-molded composite articles. For example, a problem that has long plagued the art of snowboard manufacturing has been the time and cost associated with manufacturing multiple layer laminated snowboards with metal edges to meet specific aesthetic and performance requirements. Injection molding has been sought after as a means of reducing such time and costs of manufacturing, but to date, has been unable to achieve all of the aesthetic, cost and performance attributes the public has come to expect of modern laminated snowboards. What is needed is a method for producing complex shapes of composite molded articles that meet or exceed the aesthetic and performance requirements expected of similar non-molded composite articles, preferably at reduced costs.

Injection Molding

Injection molding is where thermoplastic polymers are gravity-fed from a hopper into a barrel, melted by a reciprocating screw and/or electric heat and are propelled forward by a ram (piston, plunger) or the screw (used as a plunger) into mating steel or aluminum molds, which are cooled to below the heat-distortion temperature of the resin. The injected plastic material contracts as it cools (mold shrinkage) and shrinks. When cool enough to retain its shape, the plastic part is ejected from the mold.

Typically, good part design requires adequate taper (draft) of side walls, radii at inside corners, minimal variations in wall cross-sections, use of ribs 60% or less of outer wall thickness for stiffness, strength and minimal sink marks. Thermosetting polymers can also be injection-molded. For these materials, the barrels on the injection-molding machine are heated by hot water to a point safely below cross-linking temperature; the polymer is then propelled by ram or screw feed into heated molds. After they cure, the parts can be ejected while still hot because they have already thermally set or cross-linked.

Injection molding of polymers has revolutionized many industries. Most products today contain some form of plastic molded parts in them or consist entirely of plastic molded parts. Such products include toys, automobile parts, computer covers, phones, liquid containers and many, many other articles, too numerous to recite. However, modern molding operations have not been able to produce complex shapes of composite molded articles, in a single molding operation, that meet or exceed the aesthetic and performance requirements expected of similar non-molded composite articles. For certain products, aesthetic or performance requirements dictate that non-molded components, such as metals or ceramics, be utilized. However, incorporating polymer materials and non-molding materials in the single molding step has not been able to achieve the complex geometries required of some products, including molded snowboards with metal edges. For example, round washers have been embedded into molded parts as the base legs of appliances, computers and other similar articles to lift them off of the floor. However, such components do not require the metal and molded polymer to retain a bent, curved or complex shape whereby the shape of the article presents forces that separate the polymer and non-molded component.

Co-Injection Molding

Co-injection molding takes advantage of a characteristic of injection molding called fountain flow. That is, as the cavity is filled, the plastic at the melt front moves from the center line of the stream to the cavity walls. Because the walls are below the transition temperature (freeze temperature) of the melt, the material that touches the walls cools rapidly and freezes in place. This provides insulating layers on each wall, through which new melt makes its way to the melt front.

Sequential co-injection processes have two barrels and one nozzle in an injection molding machine. The skin polymer is injected into the mold first, then the core polymer is injected. The skin polymer is the material that is expected to be deposited on the cavity wall over the entire surface of the part. The core polymer displaces the skin polymer at the hot core, pushing it to fill the rest of the cavity. The end product is a sandwich-like structure, with the core polymer in the middle and the skin polymer on the surfaces of the part.

As two materials are processed, two hopper/screw/barrel assemblies are required for co-injection. A special co-injection nozzle allows the operator to alternate between the two materials with the speed, timing and accuracy necessary to optimize the co-injection application.

The advantages of this process are: the combination of two material properties into one part, and the maximization of the overall performance/cost ratio. One good example of co-injection is the use of polymer re-grind as the core material, while maintaining surface finish quality by using virgin polymer as the skin material. Other applications include using thermally more stable polymer as the core material to increase the thermal resistance of a part, or using a high melt-flow index polymer as the core material, to reduce the overall clamp force. Still other applications include using a core material that is lighter and exhibits more flexibility than the skin material to combine strength and flexibility to the desired part, while keeping the weight down. One combination may include a fiberglass loaded core material to provide a structural component to the part and a different skin material to maintain a smooth, consistent surface.

Numerous articles on the co-injection process have been authored. Some articles include, *Co-Injection Molding '95: Market Outlook,* by Thomas W. Betts of Battenfeld of America, Inc; *Molded-In Shielding Using the Coinjection Process,* by Thomas W. Nash and Ralph J. McDonald, IBM Application Business Systems, Rochester, Minn. 55901; *Coinjection Molding with Automotive Polyolefins,* by Bruce R. Denison, D & S Plastics International; *Recycling—Why Not Use Co-Injection Molding?,* by Joseph McRoskey of Co-Mack Technology, Inc. and Thomas W. Nash of Thomas W. Nash & Associates; and *Co-Injection Molding: Current Applications,* by Joseph McRoskey of Co-Mack Technology, Inc. (May 31–Jun. 2, 1998). The foregoing articles are incorporated herein by reference, including any drawings.

Injection and co-injection molding operations that incorporate additional non-molded components, such as metal edges, comprise additional technical hurdles to overcome, especially when such non-molded components are incorporated into a single molding operation step. Such hurdles include the need to adjust for shrinkage of the polymer as it cools in the mold; securing the non-molded components within the mold and eliminating or minimizing surface lines from inserting components into the mold. Previous attempts to address such technical matters have not succeeded in producing a snowboard that meet the expectations of an industry dominated by laminated snowboards.

Some molded snowboards comprise a low-grade plastic material with metal edges. Such snowboards lack smooth continuous curves and surfaces, lack a proper camber, tend to warp, and contain exposed metal points. Such irregularities may be caused by inserting plugs into holes made for binding fasteners, methods of holding the edges in place during the molding process and by the shrinkage of inconsistent material densities. Other injection molded snowboards leave space for metal edges and binding fasteners to be inserted and glued to the injection molded section of the snowboard as a secondary process. Such additional process steps are time consuming and expensive and produce a snowboard that suffers from some of the same delamination issues as traditional laminated snowboards.

Laminated Snowboards

Most modern snowboards are produced by laminating several materials together. Such snowboards are produced by companies such as Ride Snowboards, K2, Saloman, Burton and Morrow, to name a few. Examples of modern laminated snowboards can be found on web sites operated by these companies, including http://www.ridesnowboards.com, http://www.burton.com, http://www.k2snowboards.com, http://www.salomonsports.com/northamerica/snowboarding/connect/pub.html, and http://www.morrowsnowboards.com. This list is not an exhaustive list as there are hundreds of snowboard companies in business, owning to the popularity of the sport. Further examples may be found in U.S. Pat. Nos. 5,769,445; 5,782,482; 5,823,562; 5,851,331; 5,855,389; and 5,871,224.

The modern snowboard laminating technique consists of sandwiching multiple layers together with resins and industrial adhesives. Such layers typically include a wood or foam core, fiber reinforcement layer, thermoplastic layers, metal edge material, base material and a monocoque envelope. Other features may include the use of reinforcing materials in the end portions of the snowboard as an attempt to prevent delamination. Graphics may be applied below the top surface or monocoque envelope or to the top of it. In the sandwiched layers a set of screw threads or binding fasteners are inserted for securing bindings to the snowboard. Laminated boards have set the standard for the snowboard industry in terms of aesthetics and performance. The boards are strong enough to withstand the pressures applied by snowboard riders and flexible enough to absorb the shocks applied through maneuvers.

Notwithstanding the above, laminated boards experience several disadvantages. The laminated layers are held together by adhesives. The layers separate over prolonged use. Moreover, ice and snow can penetrate into the cracks between adhered layers and destroy the structural integrity of the snowboards, thereby delaminating the layers and the metal edges. The inserted screw threads for securing bindings depend on the strength of the adhesives. The screw threads may sometimes loosen and spin within the boards. As well, modern laminating techniques are time consuming, environmentally harmful and expensive to operate, requiring hours of labor for adhering layers, inserting screw threads and shaping the product.

What is needed is a method for producing complex shapes of composite molded articles, including snowboards, that meet or exceed the aesthetic and performance requirements expected of similar non-molded composite articles, preferably at reduced costs and using recyclable materials.

SUMMARY OF THE INVENTION

The present invention comprises products of and methods for producing complex shapes of composite molded articles, including snowboards, that meet or exceed the aesthetic, cost and performance requirements expected of similar non-molded composite articles. The injection molded or co-injection molded snowboard comprises a top surface and a bottom surface shaped to provide a center portion, at least one tip or tail portion and edges along the sides of the center portion, wherein the bottom surface is a substantially smooth continuous surface, the center portion is cambered away from the top surface and contains metal edges along the sides of the bottom surface center portion, the tip or tail portions are curved away from the bottom surface of the snowboard and the top surface contains binding mounts or screw threads flush mounted to secure bindings.

A preferred method of constructing a snowboard comprises co-injection molding, utilizing a skin polymer with a smooth finish for exterior portions of the snowboard and a core polymer that is lighter, structurally stronger and potentially cheaper than the skin polymer for the interior of the snowboard. A mold cavity is designed for the desired shape of the snowboard. In addition to providing for the shape of the snowboard, the mold cavity is designed to accommodate inserts for side metal edges and clips to secure such edges, if necessary, and inserts for top, flush mounted binding mounts or screw threads as well as the clips to secure such mounts. An additional set of metal components may be embedded within the top surface of the snowboard to compensate for warping away from the bottom metal edges due to the polymer shrink rate. The mold cavity must be designed to accommodate inserts for securing such metal components if such components are utilized.

As the polymer in the mold cools, it shrinks and the shrinkage rate depends on the polymer material selected. The metal edge material that is secured into the molten polymer does not shrink and therefore the shrinking polymer tends to "pull" the embedded metal component with it. This shrinkage and pulling action warps or bends the metal edge. The bottom surface metal edges contour to the final cure form of the majority polymer component, which for a snowboard is upward toward the top surface of the snowboard.

Several methods to adjust for the shrinkage rate of a particular polymer material may be employed. One method is to adjust the curvature of the snowboard mold cavity so that the warping will provide the desired curvature when cooling is completed. Another method is to adjust the composition of the polymer material, through additives or glass loading, to control the warping to provide the desired curvature when cooling is completed. Since the metal edges along the bottom surface of the snowboard are designed to be at a set camber after cooling, the exact adjustment necessary to achieve the desired camber after cooling involves an iterative process depending on the polymer material selection.

Another method to adjust for the shrinkage rate of a particular polymer material is to embed additional metal components similar to the bottom edge materials, into the top surface of the mold. Therefore, as the polymer material cools and shrinks, it will pull away from both the top and bottom portions in substantially equal proportions, thereby counteracting each other and producing the desired shape. Care must be taken to embed the top metal edges into the top surface so that they do not stick out of the top surface and so that they are not embedded so deep as to have no effect. The preferred depth is in the range of 0.015 to 0.060 inches (0.038 to 0.152 cm) for a snowboard that is approximately 0.5 inches (1.27 cm) thick. Proper placement involves an iterative process depending on the polymer material selection.

The mold cavity is split in two halves, an "A" half and a "B" half, with the A half representing the top of the snowboard article being manufactured and the B half representing the bottom of the snowboard article being manufactured. Loaded into each side of the B half is a B side rail insert comprising a metal rail with locator clips attached to the metal rails at about 3.5 inches (8.9 centimeters) apart center to center from adjacent clips whereby the locator clips are in molded cavities of the B side rail insert. Loaded into the A half is (i) parallel to, but not flush with, each side of the A half is an A side rail insert comprising a metal rail with locator clips attached to the metal rails at about 3.5 inches (8.9 cm) apart center to center from adjacent clips whereby the locator clips are in molded cavities of the A side rail insert and (ii) two A side nut inserts, each nut insert comprising six (6) nuts secured in place on the nut insert by six millimeter (6 mm) screws from the back of the nut insert The distance between locator clips depends on the size of the snowboard. The goal is to allow the A side metal rail to "float" a bit within the mold, so proper placement and location of clips is an iterative process depending on the size of the snowboard. The inserted nuts comprise a base that is wider than the threading such that the wider base is embedded within the molded polymer. In order to resist spinning within the molded part, as determined by screw-retention strength standards of binding mounts for alpine skis, in compliance with ASTM Standard Nos. F474-98 and F475-77 (1992), the wider base is preferably a polygon or other non-rounded shape such as a hexagon.

The locator clips for the A side rails are designed to be a specific size in order to embed the top metal rails into the top surface of the snowboard so that the metal rails do not stick out of the top surface and so that the metal rails are not embedded so deep as to have no effect on the curvature of the board as described above. Proper placement involves an iterative process depending on the polymer material selection. A depth change of just five thousandths of an inch (0.005 inches or 0.013 centimeters) causes a difference in the shape of the snowboard product.

Once all of the inserts have been located within the A and B side cavities of the mold, the mold is closed and the co-injection molding cycle is operated. The mold is then opened and the snowboard is removed from the B side of the mold. The locator clips on the B side of the mold break off, producing small plastic nubs. The screw threads holding the inserts for the binding nuts are removed. The A side locator clips are cut off and milled down.

DESCRIPTION OF THE PREFERRED EMBODIMENTS

Figure 1:
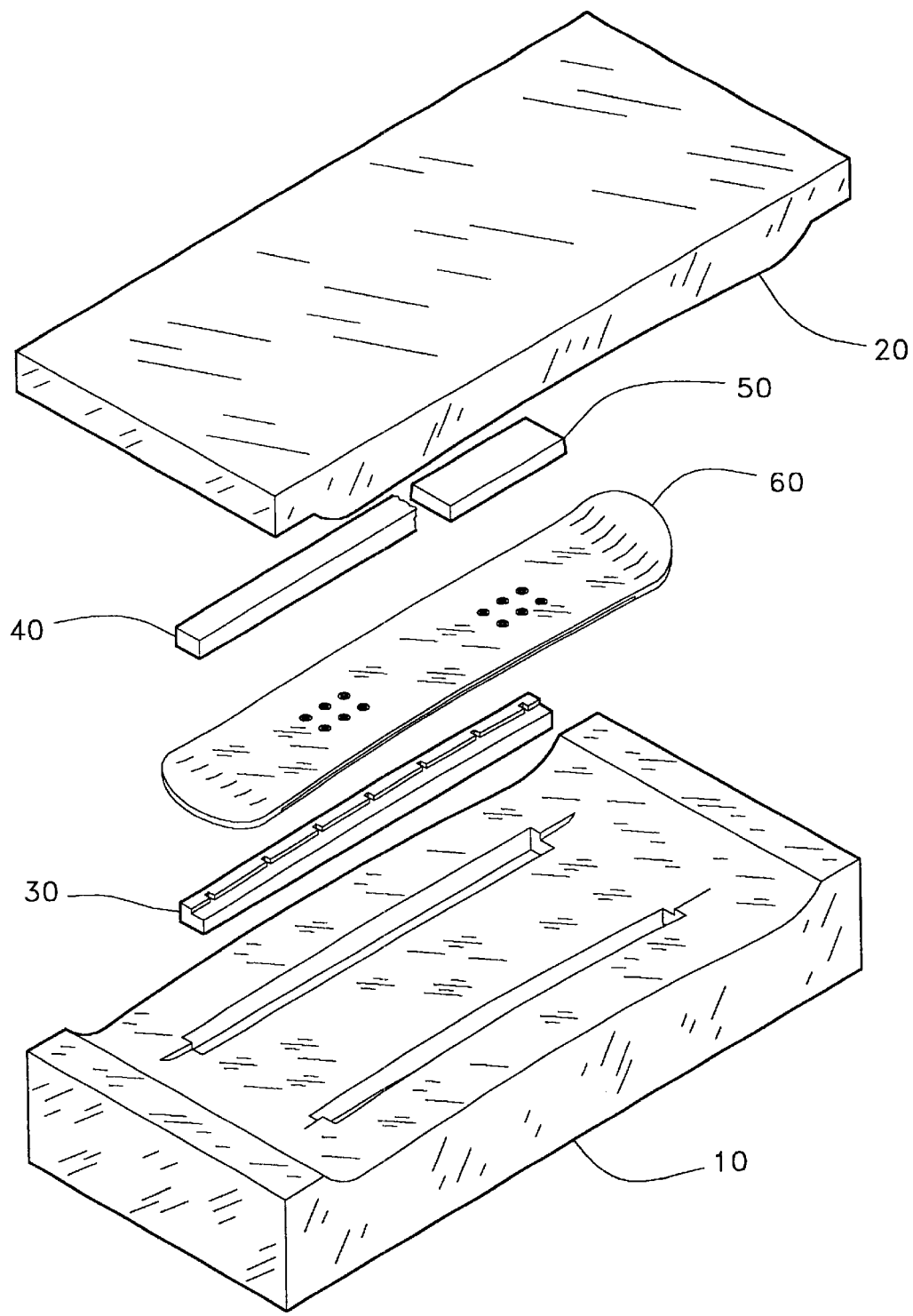
FIG. 1 depicts an open snowboard mold cavity with inserts in accordance with the present invention.

The following description includes the best presently contemplated mode of carrying out the invention. This description is made for the purpose of illustrating the general principles of the inventions and should not be taken in a limiting sense.

Injection molded parts, especially snowboards, having curved portions incorporating non-resin materials such as metal components, require innovative methods for incorporating such non-resin components while maintaining the required shape for aesthetic and performance purposes. Moreover, ensuring that the final molded product requires minimum processing after the molding operation, while incorporating such non-resin materials, is a desired benefit of the present invention. The methods described herein produce snowboards having metal edges, a cambered bottom surface, ends curved away from the bottom surface and smooth finishes at costs and production times lower than conventional laminating methods.

Definitions

"A" Side and Top Surface

The terms "A side" and "top surface" are used interchangeably throughout to refer to the top surface of the snowboard product as viewed by a typical snowboard rider. The "A side" is that portion of the mold cavity that results in the top surface of the final molded snowboard product.

"B" Side and Bottom Surface

The terms "B side" and "bottom surface" are used interchangeably throughout to refer to the bottom surface of the snowboard product as viewed by a typical snowboard rider. The "B side" is that portion of the mold cavity that results in the bottom surface of the final molded snowboard product.

Composite Molded Articles and Complex Shapes

The term "composite molded article," refers to injection or co-injection molded parts that comprise an additional non-molded component part, in a single molding operation step, so that the final article resembles a homogeneous article. The term "complex shape" refers to a composite molded article whereby the shape of the article produces forces inherent in the molding operation that tend to separate the polymer and non-molded component and whereby the separation forces are not counteracted in the molding operation, but rather, are compensated for and utilized to shape the composite molded article. An example of a composite molded article of a complex shape includes, but is not limited to, a plastic molded snowboard comprising metal edges and metal binding fasteners, where the metal edges maintain a cambered shape. Many molded articles that comprise a non-molded component that is not embedded within, surrounded by, or in sufficient quantity to counteract the molding material forces of the molding polymer will fall into this category. Some examples include, but are not limited to, airplane food trays with metal edges for fastening, flashlights, boat accessories, sporting goods, toys and many other articles where it is important to maintain a homogeneous appearance of a complex shaped article.

Co-Injection Molding

The term "co-injection molding" or "co-injected molds" as used interchangeable herein, refers to a process of injection molding whereby a skin polymer is injected into the mold first, then the core polymer is injected within the skin polymer. The skin polymer, surrounding the core polymer, is the material that is deposited on the cavity wall over the entire surface of the part.

Co-Injection Molded Snowboard

FIG. 1 depicts an open snowboard mold cavity, split in two halves, "A" half or "upper" half cavity 20 and "B" half or "lower" half cavity 10, with cavity 20 representing the top of snowboard article 60 being manufactured and cavity 10 representing the bottom of snowboard article 60 being manufactured. Snowboard article 60 is shown for illustration purposes only. Loaded into each side of cavity 10 is insert 30 (one shown) comprising a metal rail with locator clips attached to the metal rails (shown in FIG. 2a). Loaded into cavity 20 is (i) insert 40 (one shown) parallel to, but not flush with, each side of cavity 20, comprising a metal rail with locator clips attached to the metal rails (shown in FIG. 3a) and (ii) two inserts 50 (one shown) comprising six (6) nuts secured in place on insert 50 (shown in FIG. 4). More or less nuts may be utilized if desired.

Figure 2A:
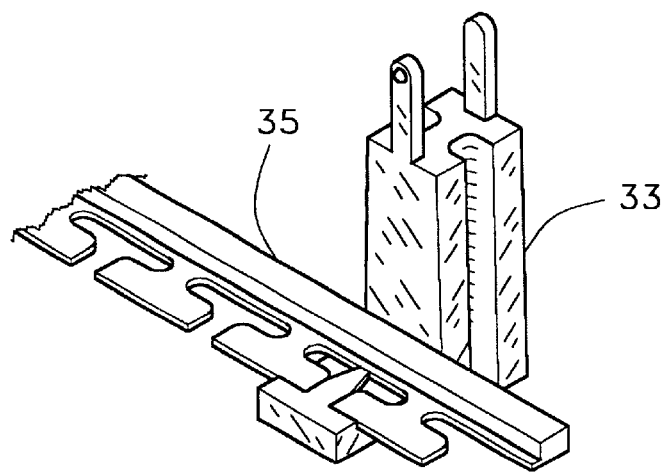
FIG. 2a depicts a metal rail and locator clip for the bottom of a snowboard in accordance with the present invention.
Figure 2B:
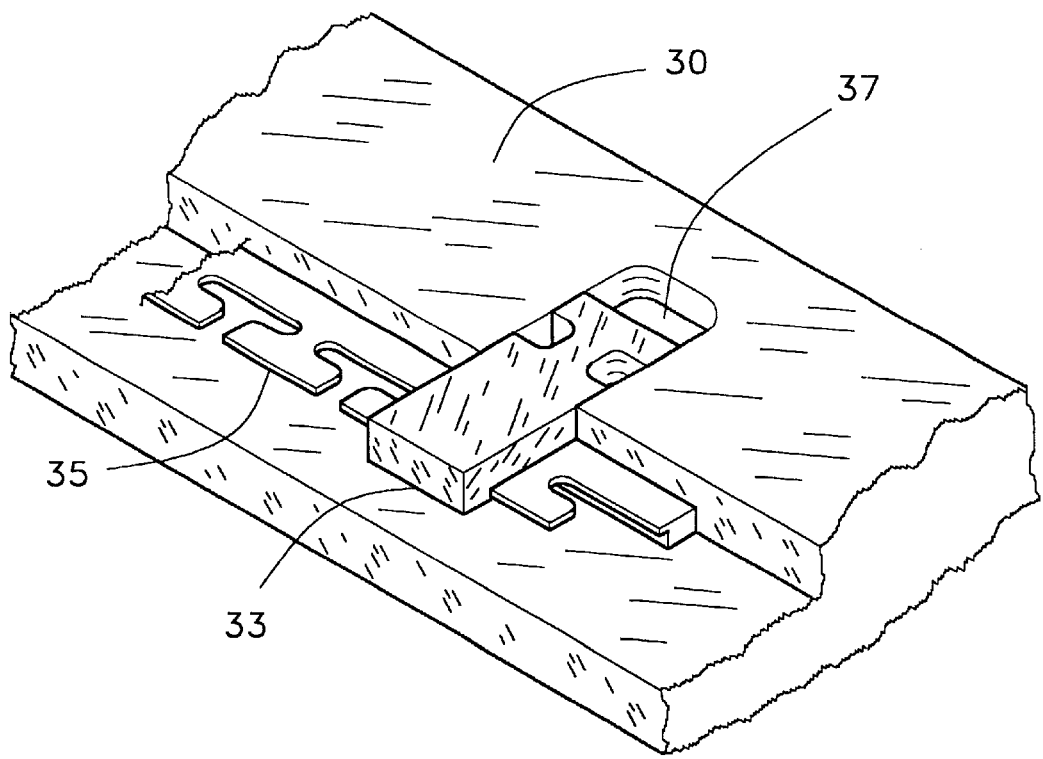
FIG. 2b depicts a mold insert incorporating a metal rail with locator clips for the bottom of a snowboard in accordance with the present invention.

FIG. 2a shows metal rail 35 with locator clips 33 attached to metal rail 35. Such locator clips 33 are usually placed at about 3.5 inches (8.9 centimeters) apart center to center from adjacent clips, along the length of metal rail 35. FIG. 2b shows metal rail 35, secured by locator clips 33, attached to insert 30 via locator clips 33 in mold cavities 37.

Figure 3A:
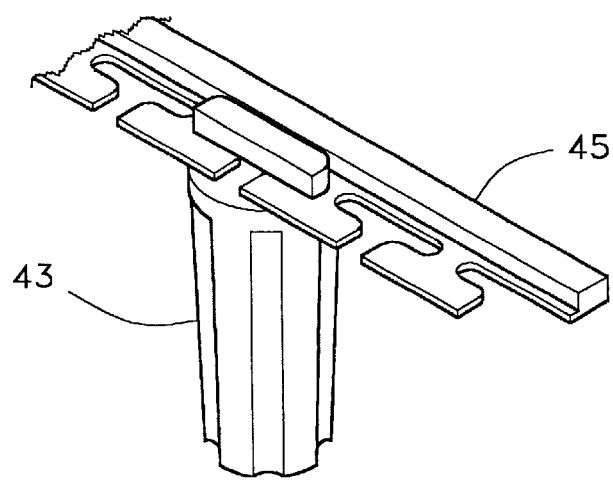
FIG. 3a depicts a metal rail and locator clip for the top of a snowboard in accordance with the present invention.
Figure 3B:
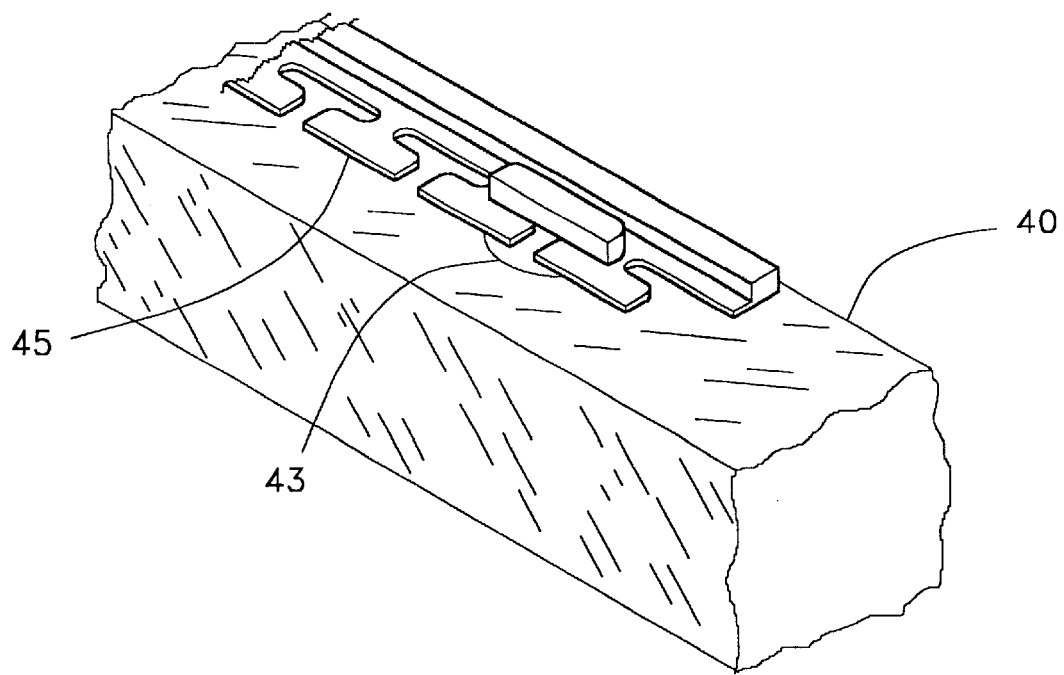
FIG. 3b depicts a mold insert incorporating a metal rail with locator clips for the top of a snowboard in accordance with the present invention.

FIG. 3a shows metal rail 45 with locator clips 43 attached to metal rail 45. Such locator clips 43 are usually placed at about 3.5 inches (8.9 cm) apart center to center from adjacent clips, along the length of metal rail 45. FIG. 3b shows metal rail 45, secured by locator clips 43, attached to insert 40 via locator clips 43 in mold cavities.

Locator clips 43 attached to metal rails 45 are designed to be a specific size in order to embed metal rails 45 into the top surface of the snowboard so that metal rails 45 do not stick out of the top surface and so that metal rails 45 are not embedded so deep as to have no effect on the curvature of the board. Proper placement involves an iterative process depending on the polymer material selection. A depth change of just five thousandths of an inch (0.005 inches or 0.013 centimeters) causes a difference in the shape of the snowboard product. A depth of 0.025 inches (0.064 cm) is preferred for a snowboard article having a center width from top surface to bottom surface of about 0.50 inches (1.27 cm).

Figure 4:
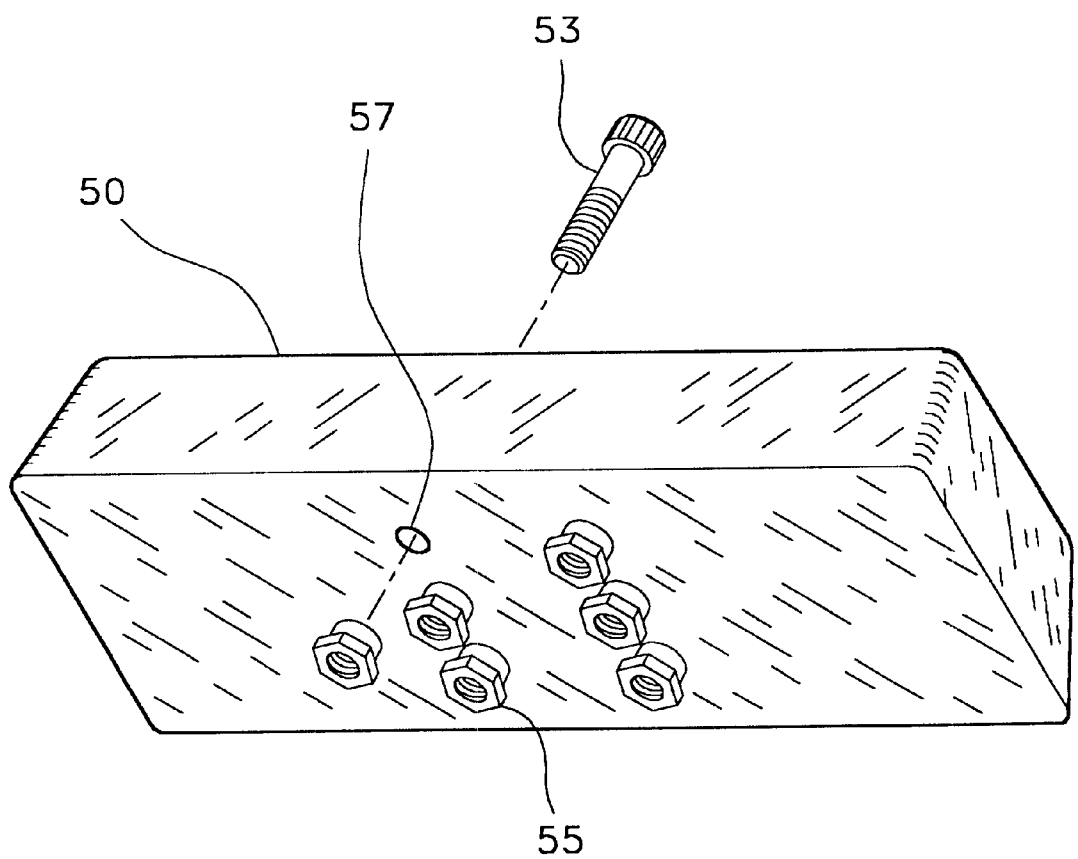
FIG. 4 depicts a mold insert incorporating a nut with a screw for incorporation into the top of a snowboard in accordance with the present invention.

FIG. 4 shows six nuts 55 secured by six millimeter (6 mm) screws 53 (one shown) attached to insert 50 via screws 53 in mold cavities 57. Nuts 55 are preferably polygon in shape, such as a hexagon, so that the nuts do not slip in the snowboard, to meet or exceed ASTM Standard No. F474-98.

Referring to FIG. 1, once inserts 30, 40 and 50 have been located within cavities 10 and 20 of the mold, the mold is closed and the co-injection molding cycle is operated according to standard co-injection operating procedures.

Figure 5:
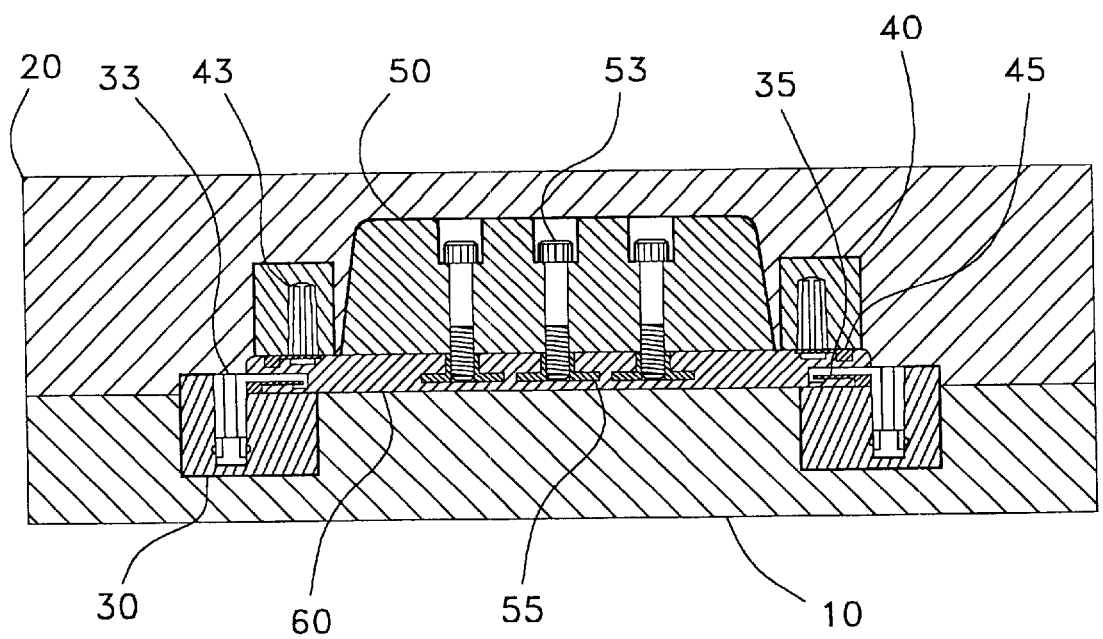
FIG. 5 depicts a cross-sectional view of a closed snowboard mold of the present invention.

FIG. 5 illustrates a cross-section of the closed mold depicting the middle of a snowboard, width wise, oriented so that the top of the FIG. is the top of the snowboard article being produced in the mold. FIG. 5 shows inserts 30, 40 and 50; locator clips 33 and 43; metal rails 35 and 45; screws 53 and nuts 55 and a molded snowboard 60. Referring to FIGS. 1 and 5, the mold is then opened by separating cavities 10 and 20 and snowboard 60 is removed from cavity 10 of the mold. As the mold opens and snowboard 60 is removed, locator clips 33 and 43 break off, leaving small nipples (not shown) that are later grinded off for aesthetic purposes. Graphics, top sheet designs or drawings may be painted or affixed onto the top surface of the snowboard during the molding process, using in-mold applications, or applied post-process to the completed snowboard.

One presently preferred snowboard produced according to the methods of the present invention has the dimensions shown in Table 1 below. However, it is to be understood that the methods of the present invention are capable of producing a plurality of snowboards and other articles differing substantially in shape and dimension.

TABLE 1

Snowboard Dimensions

| ITEM | DIMENSIONS |
| --- | --- |
| Overall length, end to end, side view | 43.791 inches (111.23 cm) |
| Thickness, side view | |
| End portions "tip and tail" | 0.203 inches (0.52 cm) |
| Center portion | 0.500 inches (1.27 cm) |
| Camber radius of center portion, side view | |
| Bottom surface | 250 inches (635 cm) |
| Top surface | 250.450 inches (636.14 cm) |
| End portions, tip and tail, side view | |
| Radii | 6 inches (15.24 cm) |
| Height, bottom to top of end portions | 2.25 inches (5.72 cm) |
| Side edge curvature radii, top surface view | 300 inches (762 cm) |
| End portion widths, tip and tail, top surface view | 9 inches (22.86 cm) |
| Binding mounts/screw threads location, top surface view | |
| From center of board, length wise | 5 inches (12.70 cm) |
| From center of board, width wise | 1.5 inches (3.81 cm) |
| Apart from each other, center to center | 1 inch (2.54 cm) |

Other shapes and sizes contemplated by the present invention include, but are not limited to, sizes of snowboards that are commercially available, including snowboards that have a length of anywhere from 90 centimeters to 170 or 180 centimeters. Such snowboards may be found at TransWorld Snowboarding on-line at http://www.twsnow.com. A sampling of sizes of commercially available snowboards, located on the "Board Genie 99" of the above web site is shown in Table 2.

TABLE 2

Commercially Available Snowboard Dimensions

| Manufacturer/Model | Length | Eff. Edge | S/C Radius | Nose | Waist | Tail | Stance |
|---|---|---|---|---|---|---|---|
| Burton: | | | | | | | |
| Fluid 59 | 159 | 124 | 901 | 29.6 | 25.6 | 29.6 | 18–24 |
| Charger 61 | 161 | 125 | 833 | 29.6 | 25.2 | 29.6 | 18–24 |
| Motion 62 | 161.5 | 126 | 810 | 29.5 | 24.9 | 29.5 | 18–24 |
| FL Project 62 | 162 | 126 | 847 | 29.3 | 24.9 | 29.3 | 18–24 |
| Johan 63 | 163 | 126 | 793 | 29.6 | 24.9 | 29.6 | 18–24 |
| Fluid 64 | 164 | 129 | 931 | 30.2 | 26 | 30.2 | 18–24 |
| Joyride: | | | | | | | |
| Factory Series | 158 | 122 | 807 | 29.3 | 24.9 | 29.3 | 18.12–24.5 |
| Factory Series | 159 | 123 | 875 | 29.7 | 25.3 | 29.7 | 18.12–24.5 |
| Premium Series 161 Dir. | 161 | 128 | 875 | 29.7 | 25 | 29.7 | 18.12–24.5 |
| Premium Series 166 Dir. | 166 | 130 | 899 | 30.1 | 25.3 | 30.1 | 18.12–24.5 |
| K2: | | | | | | | |
| Eldorado 158 | 158.2 | 123.8 | 820 | 29.9 | 25.6 | 29.9 | 18.5–26.5 |
| Fatbob 161 | 159.7 | 125.7 | 864 | 31.5 | 27.1 | 31.4 | 18.5–26.5 |
| Electra 162 | 161.4 | 126.5 | 815 | 30 | 25.4 | 29.9 | 18.5–26.5 |
| Brian Savard 161 | 162.1 | 127.3 | 869 | 29.4 | 25.1 | 29.4 | 18.5–26.5 |
| Eldorado 163 | 163 | 126.6 | 836 | 30.2 | 25.7 | 30.1 | 18.5–26.5 |
| Dart 165 | 164 | 126.4 | 843 | 29.5 | 25 | 29.5 | 18.5–26.5 |
| Morrow: | | | | | | | |
| Escape 59 | 159 | 127.1 | 883 | 29.8 | 25.1 | 29.8 | 20 |
| Escape Plus 60 | 160 | 127.7 | 883 | 31.5 | 26.9 | 31.5 | 20.5 |
| Dimension 62 | 161 | 130 | 863 | 29.7 | 24.8 | 29.5 | 20.6 |
| Rail 65 | 162 | 128.8 | 890 | 30.1 | 25.5 | 30.1 | 20.5 |
| Master 63 | 163 | 131 | 875 | 30.1 | 25.3 | 30.1 | 21.5 |
| Escape 64 | 164 | 131.6 | 890 | 30.2 | 25.5 | 30.2 | 20.5 |
| Ride: | | | | | | | |
| Timeless | 161 | 125 | 850 | 29.8 | 25.5 | 29.8 | 17–25 |
| Control | 163 | 127 | 850 | 30 | 25.5 | 30 | 17–25 |
| Rossignol: | | | | | | | |
| Butane/Stokes | 158 | 123 | 950 | 30 | 25.5 | 30 | N/A |
| Strato Wide | 159 | 121 | 950 | 30.5 | 26 | 29.9 | 18–24 |
| Nomad | 160 | 121 | 950 | 28.7 | 24.8 | 28.7 | N/A |
| Levitation Dualtec | 161 | 121 | 950 | 29.3 | 24.8 | 28.7 | 18–24 |
| Strato | 166 | 127 | ***** | 29.8 | 25.1 | 29.1 | 18–24 |
| Strato Wide | 166 | 127 | ***** | 31.2 | 26.5 | 30.5 | 18–24 |
| Salomon: | | | | | | | |
| 400 LT FR 159 WB | 159 | 125 | 960 | 29.7 | 25.7 | 29.7 | 16.92–23.2 |
| 500 pro FR 164 | 164 | 127 | 990 | 29.4 | 24.8 | 29.4 | 17.32–22 |
| 500 pro FR Adv. 165 | 165 | 129.5 | 996 | 29.6 | 25.2 | 29.1 | 18.5–22.44 |

All sizes are in centimeters. S/C Radius refers to the side cut radius. The Nose/Waist/Tail dimensions refer to the width of such sections. The Stance refers to the range of distances between the bindings for a rider's feet.

Although one embodiment of the present invention is to construct a snowboard as described above, it is to be understood that alternative methods for securing metal rails may be employed to eliminate the need for locator clips. Eliminating locator clips will reduce mold preparation time, material costs and post-mold processing time. Metal rails must be securely fastened to the outer edges of the B side mold cavity to ensure that they are placed along the bottom edges of the completed snowboard article. Injection or co-injection involves a high degree of pressure such that any space between the metal rails and the mold cavity will result in polymer material flowing around the metal rails and covering them. One such method is to utilize a rail shape that works in conjunction with the pressure of the injected polymer material so that the flow of the polymer material forces the metal rails further into the edges of the molded cavity. Such a design may work in conjunction with side magnets utilized to initially place and secure the metal rails in place. The metal rails should also contain an irregular shape within the portion that is embedded within the polymer material so as to ensure mechanical interlocking of the metal rail and the polymer material. The mechanical interlocking will secure the metal rail in the molded article and prevent separation upon use of the snowboard.

Figure 6:
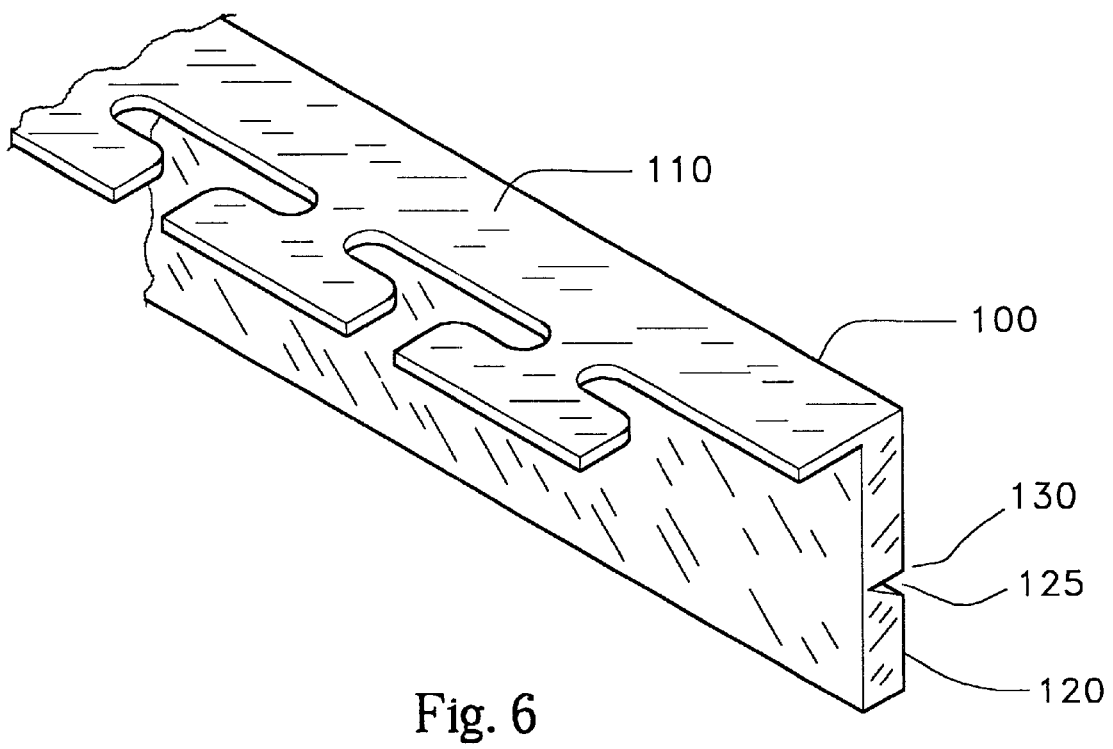
FIG. 6 depicts a metal rail for the bottom of a snowboard in accordance with the present invention.

Another method is to utilize a rail shape that extends into the polymer material of the snowboard and extends out of the snowboard, to eliminate the need for locator clips. The portion that extends out of the snowboard is used to secure the metal rail to the edge and is milled or ground off following the molding operation. FIG. 6 shows a metal rail 100 made of a hardened metal such as steel. Metal rail 100 has an irregular or scalloped side 110 for embedding into the molding material, an extended portion 120 for securing metal rail 100 along the side edges of a mold and a cut out notch 125 for easy grinding off of the extended portion 120 after the molding operation. Once the extended portion 120 is ground off, edge 130 becomes the outer edge of the bottom surface of a molded snowboard made in accordance with the present invention.

Figure 7:
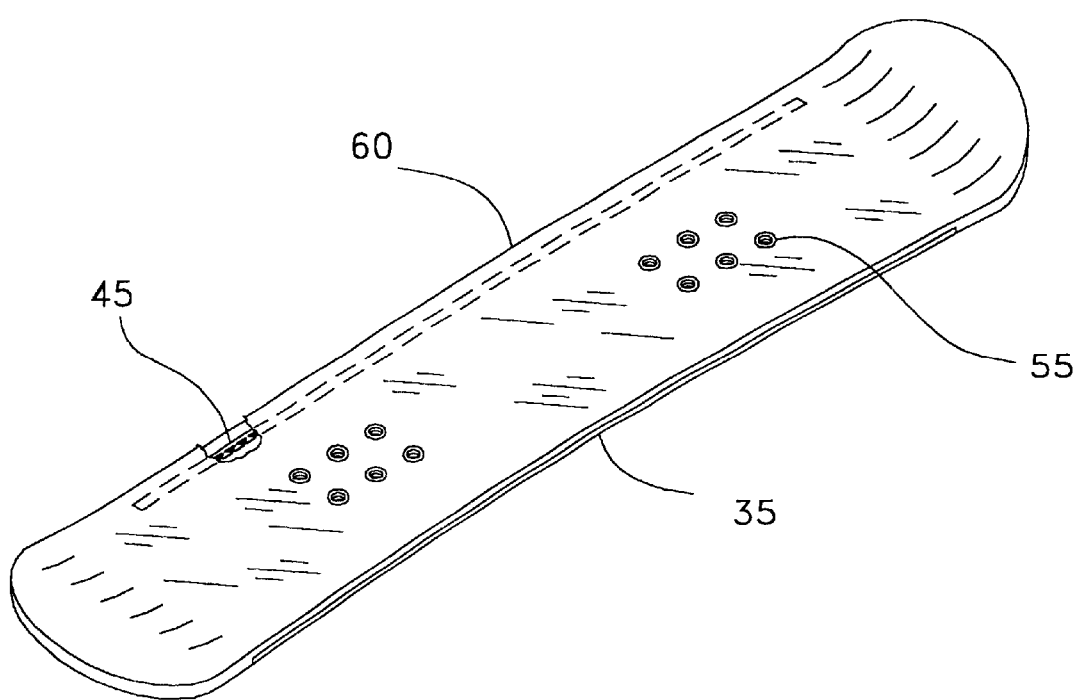
FIG. 7 depicts a snowboard produced in accordance with the present invention.

FIG. 7 illustrates a snowboard 60 made in accordance with the teachings of the present invention. Snowboard 60 contains metal rail edges 35 (one side shown) and binding nuts 55 (two sets of six shown). A cut out portion shows the embedded metal rail 45 within the top portion of snowboard 60, just below or sometimes flush with the snowboard surface.

Although a preferred embodiment of the present invention is to construct a snowboard via a co-injection molding operation, it is to be understood that other operations may be utilized either alone, sequentially or in conjunction with one another, including, but not limited to, injection molding, compression molding, extrusion molding, structural foam molding, rotational molding, thermoforming, blow molding, reaction injection molding (RIM), gas assisted molding, composites processing, hand lay-up, spray-up, centrifugal casting, matched die molding, resin transfer molding and other operations of similar import.

Two-Step Molding

An example of another molding operation to construct a snowboard is a two-step molding process, whereby the first step is to mold a snowboard core that partially extends to the surface of the snowboard product and that embeds the non-molded components such as the metal rails and the binding nuts, according to the teachings of the present invention. Thereafter, a second over-molding operation is conducted to create the outer surface of the part and yield a smooth, continuous surface. The advantages of this two-step process are the ability to combine dissimilar core and skin materials and the resulting ability to maximize the characteristics of the core/skin polymer materials. A variation is to design cavities into the first molding operation to secure the non-molded components into, for the second over-molding operation. Care must be taken in the design to allow the second molding operation to mechanically interlock at least some portions of the non-molded components so that delamination of the part does not result.

Polymer materials that may be employed in the practice of the present invention include, without limitation, high density polyethylene (HDPE), polypropylene (PP), polyurethane (PU), acetal, surlyn, nylon and acrylonitrile-butadiene-styrene (ABS), among other materials with the proper and necessary characteristics for the particular application. Other suitable polymer materials and processes are contained in the Handbook of Plastic Materials and Technology, John Wiley & Sons, Inc. (New York 1990), incorporated herein by reference. Moreover, any polymer material capable of being incorporated into an injection molding or co-injection molding, or other molding operation may be utilized in the practice of the present invention.

It should be understood, of course, that the foregoing relates only to preferred embodiments of the present invention and that numerous modifications or alterations may be made therein without departing from the spirit and the scope of the invention as set forth in the appended claims.

We claim:

1. A molded snowboard formed by a single molding operation step into a homogeneous article comprising:
   a molding material in the form of a top surface of the snowboard and a bottom surface of the snowboard shaped to provide a center portion, at least one tip or tail portion, right and left edges and edges along the sides of the center portion, wherein;
   the bottom surface is a substantially smooth continuous surface,
   the center portion is cambered away from the top surface and contains metal edges along the sides of the bottom surface center portion, wherein the metal edges comprise substantially less than ten percent (10%) of the bottom surface,
   the tip or tail portions are curved away from the bottom surface of the snowboard, and
   the top surface contains a plurality of binding mounts or threaded inserts flush mounted to secure bindings, without a binding plate.

2. The molded snowboard of claim 1 wherein the molding material is a polymer.

3. The molded snowboard of claim 2 wherein the polymer is selected from the group consisting of high density polyethylene (HDPE), polypropylene (PP), polyurethane (PU), acetal, surlyn, nylon, acrylonitrile-butadiene-styrene (ABS), and combinations thereof.

4. The molded snowboard of claim 1 wherein the bottom surface metal edges are embedded into and mechanically interlocked with the molding material.

5. The molded snowboard of claim 1 further comprising metal edges embedded within the top surface.

6. The molded snowboard of claim 5 wherein the top surface metal edges are embedded to a depth of between 0.015 to 0.060 inches (0.038 to 0.152 cm) for a snowboard that is approximately 0.5 inches (1.27 cm) thick.

7. The molded snowboard of claim 6 wherein the top surface metal edges are embedded to a depth of 0.025 inches (0.064 cm).

8. The molded snowboard of claim 1 wherein the length of the snowboard measured between the right edge and the left edge is between 90 to 180 centimeters.

9. The molded snowboard of claim 1 wherein the length of the snowboard measured between the right edge and the left edge is about 111 centimeters.

10. The molded snowboard of claim 1 wherein the radius of the bottom surface of the cambered center portion is about 250 inches (635 centimeters).

11. The molded snowboard of claim 1 wherein the radii of the curved tip and tail portions are about 6 inches (15.24 centimeters).

12. The molded snowboard of claim 1 wherein the thickness of the center portion from the top surface to the bottom surface is about 0.5 inches (1.27 centimeters).

13. The molded snowboard of claim 1 wherein the thickness of the tip and tail portions are about 0.2 inches (0.51 centimeters).

14. A molded snowboard formed by a single molding operation step into a homogeneous article comprising:
   a molding material in the form of a top surface of the snowboard and a bottom surface of the snowboard shaped to provide a center portion, at least one tip or tail portion, right and left edges and edges along the sides of the center portion, wherein;
   the bottom surface is a substantially smooth continuous surface,
   the center portion is cambered away from the top surface and contains metal edges along the sides of the bottom surface center portion,
   the tip or tail portions are curved away from the bottom surface of the snowboard, and
   the top surface contains a plurality of binding mounts or threaded inserts flush mounted to secure bindings, without a binding plate; and
   wherein separation forces between the molding material and the metal edges are utilized to shape the molded snowboard.

* * * * *